(12) United States Patent
Taylor et al.

(10) Patent No.: US 6,224,841 B1
(45) Date of Patent: May 1, 2001

(54) CATALYTIC OXIDATION

(75) Inventors: Stuart Hamilton Taylor, Liverpool; Ian Hudson, Preston; Graham John Hutchings, Osmotherly, all of (GB)

(73) Assignee: British Nuclear Fuels LC, Cheshire (GB)

( * ) Notice: Subject to any disclaimer, the term of this patent is extended or adjusted under 35 U.S.C. 154(b) by 0 days.

(21) Appl. No.: 08/941,528

(22) Filed: Sep. 30, 1997

(30) Foreign Application Priority Data

Mar. 30, 1995 (GB) .................................................. 9506583

(51) Int. Cl.$^7$ .............................. B01J 8/00; B01J 23/00; C01G 43/00
(52) U.S. Cl. ....................... 423/245.3; 423/253; 502/300; 502/305; 502/314
(58) Field of Search .................................. 423/245.3, 600, 423/604, 605, 606, 608, 253; 502/300

(56) References Cited

U.S. PATENT DOCUMENTS

| | | |
|---|---|---|
| 3,140,148 | 7/1964 | Hofer et al. . |
| 3,666,823 | 5/1972 | Grasselli et al. . |
| 4,031,149 | 6/1977 | Eden . |
| 4,162,262 | * 7/1979 | Ellgen et al. .................... 260/449 R |
| 4,247,467 | 1/1981 | Murib . |
| 4,571,315 | * 2/1986 | Gerontopoulos et al. ............ 264/0.5 |
| 5,108,978 | * 4/1992 | Durand et al. ....................... 502/304 |
| 5,170,920 | 12/1992 | Chaumette et al. . |
| 5,240,896 | 8/1993 | Nam . |

FOREIGN PATENT DOCUMENTS

| | | |
|---|---|---|
| 0604110 A1 | 6/1994 | (EP) . |
| 1215808 | 12/1970 | (GB) . |
| 1488699 | 10/1977 | (GB) . |
| 72019764 | 3/1972 | (JP) . |
| 73027281 | 4/1973 | (JP) . |
| 91 17828 A1 | 11/1991 | (WO) . |

* cited by examiner

Primary Examiner—Tom Dunn
Assistant Examiner—Cam N. Nguyen
(74) Attorney, Agent, or Firm—Klarquist Sparkman Campbell Leigh & Whinston, LLP

(57) ABSTRACT

A process for the destructive oxidation of organic compounds containing one or more optionally substituted hydrocarbon groups, comprising the step of carrying out the oxidation in the presence of a catalyst comprising uranium oxide in which the average oxidation state of the uranium is greater than four.

15 Claims, No Drawings

CATALYTIC OXIDATION

The present invention relates to catalytic oxidation, especially of organic compounds to provide destructive decomposition.

Environmental factors have recently come to the fore in relation to the effective operation of industrial chemical plants. It is now essential that emissions from such plants of so-called volatile organic compounds or VOCs which are produced in the waste streams arising from such plants are minimised. Catalytic oxidation in air of VOCs offers a procedure for destroying such compounds. Such a process offers for example advantages over thermal incineration in that operating temperatures and therefore operating costs are lower. Also, using a catalyst imparts greater control over the products of the process.

Catalysts must be found which can suitably destroy VOCs in an efficient manner in destructive oxidation processes. A number of catalysts have in the prior art been proposed for use in this application. These include noble metal catalysts, mainly Pd based and single metal oxide catalysts eg $V_2O_5$, CuO, $Co_3O_4$, $Cr_2O_3$ and $MnO_2$. Mixed metal oxides have also been evaluated in the prior art and some success has been recorded for example with hopcalite ($MnO_2$/CuO), copper chromite, cobalt molybdate and cobalt manganese oxides.

At present it is recognised that catalysts with improved activity and with more resistance to deactivation need to be found.

According to the present invention there is provided a process for the destructive oxidation of one or more organic compounds which contain one or more optionally substituted hydrocarbon groups which comprises the step of carrying out the oxidation in the presence of a catalyst comprising uranium oxide in which the average oxidation state of the uranium is greater than four. The oxide may for example be $UO_3$, $U_3O_8$ or a material having mixed oxidation states. The term "average oxidation state" refers to the average oxidation state of the "active catalyst", that is to say, the catalyst as it exists under the conditions of the reactions.

The process according to the present invention is especially suitable for the destruction of VOCs which as noted above are the volatile usually unwanted by-products of chemical reactions, eg compounds present in the waste streams of industrial chemical processes. VOCs include for example straight and branched chain and cyclic alkanes, alkenes and alkynes, aromatic, polyaromatic and fused aromatic compounds and derivatives of all of these compounds which are partially or fully substituted, eg by halogen or other substituent groups, or which contain heteroatoms, bridging groups and the like.

Where the present invention is applied to the oxidative destruction of VOCs several VOCs may be treated together and these may have similar or different functional groups.

In the present invention the oxidation reaction is likely to be heterogeneous using a uranium oxide catalyst in the solid phase, oxygen in the gas phase and the organic compound(s) to be decomposed in either the liquid and/or the gas phase.

It may be desirable in some reactions to carry out the oxidation using oxygen in the presence of steam (eg in concentrations of up to 40 per cent steam by volume). Where air or oxygen is used as the oxidant, the air or oxygen may in any case be present in a mixture with an inert diluent gas such as nitrogen.

The uranium oxide catalyst employed in the destruction of VOCs by the invention can be in a number of different forms, preferably those forms that give the optimum surface area for the reaction. Suitable forms of the catalyst include oxide, eg $U_3O_8$, powder, supported uranium oxide, eg $U_3O_8$ (eg silica, alumina or monolith support). Suitable methods of preparation include decomposition of uranium nitrate to the oxide, decomposition of the nitrate to the oxide in the presence of a support (commonly referred to as incipient wetness), oxidation of a thin film of uranium metal, sol-gel precipitation, chemical vapour deposition and plasma deposition. The uranium may comprise natural or depleted material, where depleted material has a $^{235}U$ content less than natural uranium.

The uranium oxide employed in the present invention may be in the form of a particulate-containing aerosol, a particulate bed, a collection of pellets or a supported catalyst or other suitable form. Where a supported catalyst is used, the uranium oxide may comprise a thin surface layer formed or absorbed on or embedded in a suitable substrate. The substrate may for example comprise a solid material which is stable at the maximum operational temperatures of the process which will depend upon the particular organic compound(s) to be oxidised but will generally be less than 800° C.

The catalyst may also comprise uranium oxide, preferably $U_3O_8$, and another metal or metal oxide system, examples being sodium and potassium metals and an oxide of one or more of cobalt, molybdenum, vanadium, nickel, copper, chromium, manganese and iron. These dopants may be used to tailor the catalyst for specific compositions of the VOC system and to control the product selectivity.

A mixed oxide catalyst may include two or more oxides in a single lattice (one-phase) mixed oxide and for two or more separate oxides which may be physically rather than chemically combined. Suitable methods of preparation for the mixed oxide catalyst include, decomposition of uranium nitrate and an appropriate soluble metal salt, decomposition of the nitrates in the presence of a suitable support, sol-gel precipitation, chemical vapour deposition and plasma deposition.

The substrate may conveniently comprise a microporous or mesoporous material, where uranium oxide may be held within the pores of the material, distributed across the internal surface area and/or incorporated into the support framework. The substrate material in this example may comprise a zeolite type material. For example, a soluble uranium salt such as the nitrate, may be added to the synthesis gel of suitable zeolite type preparation. One possible outcome of this method of preparation is to form nanoparticles of the oxide supported in a microporous environment. The method may also be used to form the mixed oxide form of the catalyst.

Other suitable solid materials which may or may not be microporous for use as the substrate to support the uranium oxide include ceramic, metal or mixed ceramic/metal materials. Alumina or silica are suitable as oxide substrates. Stainless steel is suitable as a metal substrate.

The uranium oxide may be doped with a known stabiliser such as yttria to stabilise the material in an oxidising environment.

As exemplified below we have found that uranium oxide with uranium of high oxidation state, especially $U_3O_8$, provides a higher activity catalyst which shows good selectivity allowing greater catalyst volumes to be employed at lower cost than prior art catalysts, especially for VOC destruction. Uranium oxide such as $U_3O_8$ also shows high resistance to deactivation and can be readily reactivated.

In particular, we have found surprisingly and beneficially that a high yield can be obtained from oxidation reactions even at relatively low temperatures compared with prior art catalysts under otherwise similar conditions. Initial heating to a temperature above a threshold activation temperature may be required to initiate the oxidation reaction but after the reaction has been initiated and sustained the applied environmental temperature may be significantly reduced, without significant reduction in the oxidation conversion yield.

Where the process according to the present invention is a gaseous phase reaction employed to oxidise a VOC, a flow of an appropriate oxidant (source of oxygen) and a flow of a vaporised form of the VOC obtained from heating the compound may be combined prior to or at a reactor containing the uranium oxide catalyst. Examples of appropriate oxidants include air, oxygen, ozone, nitrous oxide, nitric oxide, nitrogen dioxide and hydrogen peroxide. The reactor may be held in a enclosure, eg a furnace, whose temperature can be adjusted to initiate and sustain the reaction. This may involve initially raising and then subsequently lowering the applied temperature. Desirably, the carbon in the VOC is oxidised to $CO_2$.

Embodiments of the present invention will now be described by way of example (as specified in various Examples described below).

Catalyst performance testing as described in the Examples which follow hereinafter was carried out in a conventional gas phase/vapour phase reactor in which oxidation of a hydrocarbon was carried out over a bed of the catalyst in a temperature controlled furnace.

Procedures

Hydrocarbon VOCs

Nitrogen and air were used as diluent and oxidant respectively, the gaseous flow rates of these gases being regulated by mass flow controllers. Liquid hydrocarbon reactant feeds were introduced via a syringe pump to a stainless steel vaporiser maintained at a temperature of 150° C. The resulting vapour was subsequently swept through the reactor in the nitrogen/air gas stream. An option for feeding other gaseous hydrocarbons was provided by a further mass flow controller.

Chlorobenzene

Typical reaction conditions employed a chlorobenzene/oxygen/nitrogen feed in the composition Jan. 29, 1979.

Catalysts a) Single oxide catalysts

The single oxide catalysts used in these studies were $U_3O_8$, $UO_3$ and $Co_3O_4$. The oxides were used as supplied and did not undergo any form of chemical or thermal pre-treatment.

b) Silica supported catalysts

A series of uranium containing catalysts, based on a system of silica supported uranium oxide, has been prepared. These catalysts were prepared by an incipient wetness technique described by G. C. Bond, Heterogeneous Catalysis Principles and Application, Clarendon Press, Oxford, 2nd Edition 1987, p101. This procedure entailed the addition of a minimum amount of a solution containing the supported ions to the support material. Initial catalysts were 10 mol % U on $SiO_2$ prepared by the following method. $SiO_2$ was impregnated with a minimum quantity of solution of $UO_2(NO_3)_2 \cdot 6H_2O$ dissolved in distilled water. The pH of the resulting uranyl nitrate solution was ca. 2.5.

c) Doped catalysts

Doped catalysts were also prepared by the addition of a second component to the $U/SiO_2$ base catalyst. The total active loading for this catalyst was 10 mol % and was composed 9 mol % U and 1 mol % X, where X was Cu or Cr. The dual component catalysts were prepared by impregnating the appropriate $U/SiO_2$ precursor, previously dried at 100° C. for 24 hours, with a nitrate solution of the second component. The resultant material was dried for a further 24 hours at 100° C.

Prior to use the catalysts were calcined by a two stage process which involved heating the precursors in static air for 1 hour at 300° C. and then for a further 3 hours at 800° C. This calcination process decomposed residual nitrate on the support and formed the supported oxides.

d) Mixed Oxide Catalysts

Two further catalysts were prepared and tested for chlorobenzene and benzene destruction. These catalysts were mixed oxide systems prepared by grinding oxides of copper (CuO) and cobalt ($Co_3O_4$) with $U_3O_8$. The catalysts were prepared containing 8.5 wt % of the cobalt and copper oxide and were denoted $Co_3O_4/U_3O$, and $CuO/U_3O_8$ respectively. These catalysts were used as prepared and were not calcined before testing.

c) Catalyst characterisation

Catalysts were characterised by differential scanning calorimetry using a Perkin Elmer 7 series thermal analysis system. The samples were typically 10–20 mg in weight and were sealed in aluminium analysis pans. Initial scans were carried out from 40° C. to 600° C. at a ramp rate of 40° C. min$^{-1}$. The analysis was repeated for temperature regions of interest at a lower ramping rate of 10° C. min$^{-1}$ to improve resolution. Catalysts were also characterised by X-ray diffraction.

d) Loading catalysts into reactor

The catalyst was pelleted to a 0.425–0.6 mm particle size range before loading into the reactor. The reactor in which the catalyst was incorporated was constructed from stainless steel tubing with an external diameter of either 0.5 inch (0.12 cm) or 0.25 inch (0.66 cm) depending on the experiment. The catalyst bed was secured in place between plugs of silica wool and heated by a tube external furnace with a uniform heated zone.

Reaction measurements

The reaction temperatures were measured inside the furnace and inside the reactor tube close to the gas exit from the catalyst bed. The reaction flow rate was defined in terms of gas hourly space velocity (GHSV). This is defined below in Equation 1 as follows and has the units of reciprocal time.

$$GHSV = \frac{\text{volume of reactant gas at } STP \text{ per hour}}{\text{volume of catalyst}} \qquad \text{Equation 1}$$

If not otherwise specified in the following examples, the GHSV is 70,000 h$^{-1}$.

To ensure that the reactants and products did not condense inside the reactor the gas lines were maintained at a temperature of 110° C. The reactor design also included an inlet for the co-feeding of water introduced to the vaporiser via a pump. Analysis of products was carried out on-line by gas chromatography and mass spectrometry (quadrupolar). Separation was achieved using a molsieve column. The configuration of the valves allowed the complete analysis of reactants and products with a single injection, when a suitable temperature programmed regime was employed.

The GC was calibrated using $CO_2$ and $O_2$ by on-line injection of known concentrations of these gases diluted with $N_2$.

The conversion of hydrocarbon in the oxidation reaction was calculated by difference, as indicated in Equation 2 as follows:

$$\text{Hydrocarbon Conversion} = \frac{Vin - Vout}{Vin} \times 100\% \qquad \text{Equation 2}$$

where Vin=volume percentage of hydrocarbon in the reactor input feed stream and Vout=volume percentage of hydrocarbon in the reactor output stream.

The $O_2$ conversion was also calculated by the same method. Product selectivities were calculated as a percentage of the total detected products.

EXAMPLE 1

The reaction feed was a gaseous mixture of benzene ($C_6H_6$): 20 parts $O_2$: 79 parts $N_2$. The catalyst was pelletised $U_3O_8$.

Studies of the reaction using the $U_3O_8$ catalyst were carried out using a gas hourly space velocity (GHSV) of 8,000 $h^{-1}$ and showed 100% $C_6H_6$ conversion at 350° C. The reaction products were CO and $CO_2$ with selectivities of 34% and 66% respectively. Increasing the temperature above 350° C. increased the selectivity towards $CO_2$. When the GHSV was increased to 15,000 $h^{-1}$ no deleterious effect was observed on the conversion of $C_6H_6$ which was still 100% at 350° C. A further increase in the GHSV to 30,000 $h^{-1}$ shifted the temperature required for complete $C_6H_6$ destruction to 400° C. The reaction products were CO and $CO_2$, which were produced in similar selectivities to the studies carried out at lower space velocities.

The highest GHSV studied was 70,000 $h^{-1}$, which is close to the uppermost limit of space velocity currently used for known industrial catalysts. Under these conditions the $U_3O_8$ catalyst was still active. Increasing the temperature from 300° C. to 380° C. in 10° C. increments at this GHSV had little effect on the $C_6H_6$ conversion. However, increasing the temperature from 380° C. to 390° C. had a significant effect as $C_6H_6$ conversion rose to 96% and reached 100% at a temperature of 400° C. CO and $CO_2$ were the only products with selectivities which remained approximately constant, around 20% and 80% respectively. Decreasing the temperature of the furnace from 400° C. to 350° C. did not result in the catalyst activity falling to zero as may be expected. In contrast, a $C_6H_6$ conversion of 95% was maintained with CO and $CO_2$ selectivities remaining constant down to a temperature of 300° C.

The temperature inside the reactor tube, after the catalyst bed, was significantly higher than the furnace temperature under conditions where the catalyst was active. The temperature increase inside the reactor tube was typically 25° C. above the furnace temperature. When the furnace temperature was decreased to 350° C. and the $U_3O_8$ remained active, the reaction temperature was 380° C. Initial studies showed that when the catalyst temperature was increased to 380° C. no activity was observed. These findings indicate that the $U_3O_8$ catalyst remained active after treatment at a higher temperature.

EXAMPLE 2: (Comparative)

A comparison was made with the prior art by using $Co_3O_4$, a known active combustion catalyst, in place of the $U_3O_8$ used in an experiment in which the conditions were otherwise as in Example 1. Using a GHSV=8,000 $h^{-1}$, a $C_6H_6$ conversion of 91% to $CO_2$ was obtained over $Co_3O_4$ at 350° C., compared to 100% over $U_3O_8$ under the same conditions. Although increasing the temperature above 350° C. increased the conversion over $Co_3O_4$ it did not reach 100% but showed a maximum of 97% at 450° C. When the GHSV was increased to 30,000 $h^{-1}$ maximum $C_6H_6$ conversion was 82% at 450° C. Increasing the GHSV further to 70,000 $h^{-1}$ increased the conversion of $C_6H_6$ slightly to 90% at a temperature of 450° C.

An increase in the temperature of the exit gases over the furnace temperature as in Example 1 was also seen over the $Co_3O_4$ catalyst at high space velocity in a similar manner to that over $U_3O_8$ although no hysteresis was observed using $Co_3O_4$.

Generally, the results obtained indicate that $U_3O_8$ is a more active catalyst than $Co_3O_4$ for the oxidation of $C_6H_6$ over the GHSV range 7,900 to 70,000 $h^{-1}$.

EXAMPLE 3

Using the same reagent/gas concentration as in Example 1 (but with benzene replaced by butane), butane was oxidised over a $U_3O_8$.

Using a GHSV=8,000 $h^{-1}$ the $U_3O_8$ catalyst showed a conversion of $C_4H_{10}$ increasing from 0% to 100% at 600° C. Initially $CO_2$ was the exclusive reaction product, decreasing to 90% selectivity at 450° C., the remaining product being CO. Above 450° C., $CO_2$ selectivity increased at the expense of CO until it reached 98% at 600° C.

Increasing the GHSV to 30300 $h^{-1}$ increased the temperature for initial catalytic activity by 50° C. to 350° C. Between 350° C. and 600° C. $C_4H_{10}$ conversion increased steadily, reaching a maximum of 98% at the highest reaction temperature. The reaction products were CO and $CO_2$. $CO_2$ was the major product, with selectivity varying in the same manner as previously described for the studies at GHSV= 8,000 $h^{-1}$ in this Example 3.

The highest GHSV investigated was 70,000 $h^{-1}$. At this flow rate the temperature required for initial activity was shifted to 450° C. The maximum $C_4H_{10}$ conversion was 80% at 600° C., which was the highest temperature investigated. $CO_2$ was the most selective product CO was also detected at all temperatures when the catalyst was active. Comparison with the studies at flow rates showed that $CO_2$ selectivity was slightly reduced, although $CO_2$/CO ratios were at least 4/1.

EXAMPLE 4 (Comparative)

Oxidation of butane using the same reagent concentration as in Example 1 (with butane in place of benzene) was carried out over a $Co_3O_4$ catalyst.

The $Co_3O_4$ catalyst was active 150° C. lower than $U_3O_8$, as initial activity was observed at 350° C. However, maximum $C_4H_{10}$ conversion over $Co_3O_4$ was 75% compared to 81% over $U_3O_8$ The maximum $C_4H_{10}$ and $O_2$ conversions over $Co_3O_4$ were at 500° C. Increasing the temperature to 600° C. resulted in a decrease of both conversions. These observations suggest that whilst increasing the reaction temperature above 600° C. would increase the $C_4H_{10}$ conversion over $U_3O_8$, it would have an adverse effect on $Co_3O_4$, which may deactivate at high reaction temperatures.

EXAMPLE 5

Benzene oxidation was carried out as in Example 1 except that the catalyst was $UO_3$.

At GHSV=35,000 $h^{-1}$ catalytic activity was initially present at 400° C. with a low $C_6H_6$ conversion of less than 1%. $C_6H_6$ conversion increased to 97% at 600° C., the reaction products were CO and $CO_2$ with selectivities of 26% and 74% respectively. Increasing the GHSV to 70,000 $h^{-1}$ had little influence on the activity or product selectivity. The maximum $C_6H_6$ conversion was 89% at 500° C. which was the highest temperature investigated.

The activity for $C_6H_6$ destruction over $UO_3$ was clearly inferior to $U_3O_8$ which produced 100% conversion at 400° C. under equivalent flow conditions. Although $U_3O_8$ was more active there was little difference in the product selectivities between the two uranium oxides.

EXAMPLE 6

Butane oxidation was carried out as in Example 3 but with $UO_3$ as the catalyst.

$C_4H_{10}$ combustion over $UO_3$ at GHSV=35,000 $h^{-1}$ was significantly lower than over $U_3O_8$ at comparable space velocity. The maximum $C_4H_{10}$ conversion was 53% at 600° C. It was also evident that the selectivity towards CO was enhanced, showing a maximum of 42% at 550° C. Increasing the GHSV to 70,000 $h^{-1}$ over the $UO_3$ catalyst improved the performance, possibly as a consequence of the increased efficiency of heat removal from the catalyst bed during the highly exothermic reaction. Maximum $C_4H_{10}$ conversion was 85% at 600° C., which was very similar to $U_3O_8$. Small differences in product selectivity were evident as $UO_3$ generally produced greater quantities of CO than $U_3O_8$. A maximum CO selectivity of 35% was observed over $UO_3$.

EXAMPLE 7

Benzene oxidation was carried out as in Example 1 with the same gas concentrations as in Example 1. A catalyst comprising a mixture of 10 mol per cent $U_3O_8$ on $SiO_2$ was used in this case. At a GSVH of 70,000 $h^{-1}$, the performance of the catalyst matched that of $U_3O_8$ above, producing 100% conversion at 400° C.

A large hysteresis effect was observed on decreasing the temperature from 400° C. The conversion remains as high as 93 per cent even when the reactor temperature is reduced to 200° C. This is a highly surprising result and illustrates that, when reaction has been established, low temperature, high efficiency oxidation of VOCs such as benzene may be carried out using the process of the present invention, especially using $U_3O_8$ supported on a substrate such as $SiO_2$.

EXAMPLE 8

Butane oxidation was carried out as in Example 1 with the same gas concentrations as in Example 1 (with butane replacing benzene). A catalyst comprising a mixture of 10 mol per cent $U_3O_8$ on $SiO_2$ was used in this case. Using a GHSV of 70,000 $h^{-1}$, butane conversion was 100% at 500° C. This activity was significantly higher than that shown by $U_3O_8$ which was only 80% conversion at 600° C.

The hysteresis in conversion which was characteristic for benzene combustion was also evident for butane combustion. Decreasing the temperature below 500° C. caused the butane conversion to drop below 100%. However, conversion remained above 70% down to 400° C.

EXAMPLE 9

Addition of Co to the $U/SiO_2$ system resulted in benzene conversion of 91% at 400° C. and 100% at 500° C.

Benzene conversion using $Cr/U/SiO_2$ was slightly lower than $U/SiO_2$ but greater than $Co/U/SiO_2$.

The addition of Cu to $U/SiO_2$ produced a catalyst which had a similar benzene conversion activity as the undoped $U/SiO_2$ catalyst. However, the doped catalyst had an extremely beneficial effect on the product distribution, as the selectivity towards $CO_2$ was increased across the entire temperature range. The $CO_2$ selectivity over the $Cu/U/SiO_2$ catalyst was greater than 99% with only trace quantities of CO detected at 400° C. and 450° C.

EXAMPLE 10

The addition of Cr to $U/SiO_2$ produced a catalyst which showed enhanced $C_4H_{10}$ conversion at the lower reaction temperatures investigated. This effect was significant at 400° C. as $C_4H_{10}$ conversion over $Cr/U/SiO_2$ was 93% whilst the $U/SiO_2$ catalyst was inactive. $C_4H_{10}$ conversion increased steadily above 400° C. reaching 100% at 550° C. The CO selectivity produced over $Cr/U/SiO_2$ was greater than the $U/SiO_2$ system.

Use of a $U/SiO_2$ catalyst doped with Cu showed a significant $C_4H_{10}$ conversion at 450° C. The conversion over $Cu/U/SiO_2$ was 95% compared to 7% for $U/SiO_2$ This level of conversion over $Cu/U/SiO_2$ was equivalent to the $Cr/U/SiO_2$ catalyst (94%), although at the lower temperature of 400° C. conversion over $Cu/U/SiO_2$ was only 3% compared to 93% over $Cr/U/SiO_2$. An enhancement in the $CO_2$ selectivity was also evident. $CO_2$ selectivity was greater than 97% at all temperatures and was 100% at low conversion and at 550° C.

Doping with Fe produced about 95% conversion of butane at 600° C. (with 100% $CO_x$ selectivity)

The incorporation of the components Cr, Fe and Cu into the $U/SiO_2$ system decreased the temperature for initial $C_4H_{10}$ combustion activity by at least 50° C. The initial activity was lowered by 100° C. over $Cr/U/SiO_2$.

EXAMPLE 11

The uranium oxides $U_3O_8$ and $UO_3$ were tested for the destruction of chlorobenzene. A GHSV of 70,000 $h^{-1}$ was used.

Pelleted $U_3O_8$ showed initial activity at 300° C., but conversion remained below 2% up to 400° C. Chlorobenzene conversion increased significantly above 400° C. reaching 87% at 450° C.

Comparison of the pelleted $U_3O_8$ activity with chlorobenzene destruction over a sample of powdered $U_3O_8$ showed distinct differences. The powdered sample showed higher activity producing 100% chlorobenzene conversion at 350° C. CO and $CO_2$ were the reaction products with selectivities of 40% and 60% respectively. These products selectivities remained constant when the temperature was increased to 400° C. The relationship between the decrease in catalyst particle size and the increase in catalytic activity is consistent with mass transport limitations over the pelleted catalyst.

The conversion of chlorobenzene over powdered $U_3O_8$ was investigated for hysteresis effects, which were characteristic for the destruction of butane and benzene. When the reaction temperature was decreased from 350° C. the catalyst remained active producing a 90% conversion at 250° C. Decreasing the temperature further to 200° C. resulted in a total loss of activity. This hysteresis effect has been attributed to the highly exothermic nature of the combustion reaction which results in an increase of the catalyst bed temperature sustaining the combustion activity.

Chlorobenzene oxidation over powdered $UO_3$ showed that the catalyst was inactive below 450° C. Conversion was 72% at 500° C. and CO and $CO_2$ were the only products, which did not show any variation from 40% and 60% selectivity respectively as the reaction temperature was increased.

EXAMPLE 12 (comparative)

For comparison with Example 12, the effectiveness of $Co_3O_4$ as catalyst in the conversion of chlorobenzene was investigated. Initial activity was observed at 450° C. $CO_2$ selectivity was 100% although conversion was limited to 10%. Chlorobenzene conversion rose steadily as the temperature was increased, reaching 62% at 600° C. The increase in conversion was accompanied by a corresponding decrease in $CO_2$ selectivity. CO and $CO_2$ selectivities at 600° C. were 16% and 84% respectively.

EXAMPLE 13

A range of silica supported uranium oxide catalysts were screened for the oxidative destruction of chlorobenzene. Chlorobenzene conversion over pelleted $U/SiO_2$ increased from a trace at 350° C. to 83% at 400° C., where CO and $CO_2$ were produced with selectivities of 44% and 56%. Results obtained from the powdered $U/SiO_2$ catalysts were slightly different from the pelleted form. The powdered catalyst showed 100% conversion at 400° C. compared to the 83% obtained previously. Little difference was evident in product selectivities between the two forms of the catalyst. The increase in activity on the reduction of catalyst particle size is consistent with results obtained over $U_3O_8$ and demonstrated that activity over the pelleted material was subjected to limitations from mass transport effects. Hence all the catalysts tested in the following examples were used in powdered form.

EXAMPLE 14

The catalysts $Co/U/SiO_2$, $Cr/U/SiO_2$, $CU/U/SiO_2$ and $Fe/U/SiO_2$ all showed remarkably similar behaviour for the destruction of chlorobenzene. These catalyst were inactive at 300° C. and all, with the exception of $Co/U/SiO_2$, exhibited trace chlorobenzene conversion at 350° C. with 100% selectivity towards $CO_2$. Chlorobenzene conversion over these catalysts was 100% at 400° C., where CO was also a major combustion product. CO selectivity was in the region of 30–40% and $CO_2$ constituted the balance of products.

$Mn/U/SiO_2$ showed a similar reactivity trend to the aforementioned catalysts although the temperature for 100% chlorobenzene conversion was shifted by 50° C. higher to 450° C. The product selectivities were not altered by this shift in temperature. Chlorobenzene over $Ni/U/SiO_2$ catalyst showed trace conversion at 350° C. with 100% $CO_2$ selectivity, conversion increased to 89% at 400° C. and further to 96% at 450° C. Complete chlorobenzene conversion was not reached in these experiments. CO selectivity over $Ni/U/SiO_2$ was the highest shown in these studies with 46% at 400° C., although when the temperature was increased it did fall marginally.

The most active catalysts for chlorobenzene destruction were $U_3O_8$ and $Co/U/SiO_2$ which destroyed chlorobenzene to ca. 12 parts per million.

EXAMPLE 15

Two catalysts composed of $Co_3O_4/U_3O_8$ and $CuO/U_3O_8$ were synthesised and tested for the destruction of chlorobenzene at a GHSV of 70,000 $h^{-1}$. Both catalysts contained a relatively high concentration, 8.5 wt%, of $Co_3O_4$ and CuO.

With $Co_3O_4/U_3O_8$, catalytic activity was observed at 350° C. with a 40% chlorobenzene conversion. This did not increase as the temperature increased but remained approximately constant. The $CO_2$ selectivity at 350° C. was 73% increasing slightly to 75% as the temperature was raised to 400° C., the remaining product as CO.

Using $CuO/U_3O_8$, initial catalytic activity was observed at 350° C. where CO and $CO_2$ were produced with selectivities of 21% and 89%. Chlorobenzene conversion increased to 57% when the reaction temperature was raised to 400° C., the increase in temperature also increased slightly the selectivity towards $CO_2$.

The addition of 8.5 wt % $Co_3O_4$ and CuO to $U_3O_8$ decreased the conversion at a given temperature relative to $U_3O_8$. The dual component oxide catalysts also showed reduced activity when compared to the doped uranium oxide silica supported catalysts. However, the addition of the oxides $Co_3O_4$ and CuO to $U_3O_8$ did have a beneficial effect by increasing selectivity towards $CO_2$.

EXAMPLE 16

The destruction of benzene over the $Co_3O_4/U_3O_8$ and $CuO/U_3O_8$ catalysts has also been investigated.

Over $Co_3O_4/U_3O_8$ benzene conversion was 99% at 350° C. and $CO_2$ selectivity was 89%. As the reaction temperature was increased the selectivity towards $CO_2$ also increased. The benzene destruction results over $CuO/U_3O_8$ were very similar to $Co_3O_4/U_3O_8$, but showed slightly lower activity. The benzene conversion was 93% at 350° C. and $CO_2$ selectivity was 95% increasing to 99% at 400° C.

The high benzene conversion over $Co_3O_4/U_3O_8$ and $CuO/U_3O_8$ at 350° C. was significant. At this temperature and GHSV=70,000 $h^{-1}$, single uranium oxide and silica supported catalysts only showed trace conversions. $Co_3O_4$ is active for benzene destruction at lower temperatures than uranium based catalysts, although ultimately the conversion is lower than $U_3O_8$. The advantages of activity at lower temperatures and the higher benzene conversion of $U_3O_8$ are maintained when the oxides are mixed together.

EXAMPLE 17

The oxidative destruction of cyclohexanone was carried out using a $U_3O_8$ catalyst at a GHSV equivalent to 70,000 $h^{-1}$.

100% cyclohexanone conversion was observed as 300° C., where CO and $CO_2$ were produced with selectivities of 29% and 71% respectively. Increasing the reaction temperature increase the $CO_2$ selectivity which was a maximum of 78% at 400° C. Decreasing the temperature once the catalyst was active produced a large hysteresis effect for cyclohexanone conversion. Conversion remained at 100% even when the reaction temperature was decreased 50° C.

EXAMPLE 18

The destruction of cyclohexanone over $U/SiO_2$ was very similar to $U_3O_8$, showing 100% conversion at 300° C., $CO_2$ selectivity being slightly lower.

EXAMPLE 19

The destruction of butylacetate was investigated at GHSV of 70,000 $h^{-1}$ over powdered $U_3O_8$. Catalytic activity was first observed at 350° C. with 100% butylacetate conversion. The reaction products was CO and $CO_2$ with selectivities for 25% and 75% respectively. $O_2$ conversion was 40%. On increasing the reaction temperature to 400° C., butylacetate conversion remained at 100% and the product selectivities were also unchanged.

With $U/SiO_2$, catalytic activity was first demonstrated at 350° C. with a 100% butylacetate conversion. $O_2$ conversion was 40%. The reaction products were CO and $CO_2$ with selectivities of 20% and 80% respectively. On increasing the reaction temperature to 400° C., the selectivity towards $CO_2$ decreased to 65%. This was reflected by a drop in $O_2$ conversion to 35%.

Butylacetate destruction was also investigated over powdered $Cu/U/SiO_2$. Catalytic activity was first exhibited at 350° C. with 100% butylacetate conversion. The reaction products was CO and $CO_2$ with a selectivities of 5% and 95% respectively. Increasing the reaction temperature to 400° C. had little effect, increasing the $CO_2$ selectivity slightly to 97%.

EXAMPLE 20

The destruction of benzene was investigated in the presence of water vapour which is common in VOC streams derived from water treatment processes. The catalyst was $U_3O_8$ and the feed was 1% benzene, 8% water with the balance air, the GHSV being 70,000 $h^{-1}$. The catalyst was inactive at 350° C. but showed a steeply rising conversion to 82% at 400° C. with CO and $CO_2$ selectivities of 21% and 79% respectively. Benzene conversion increased to 95% at 450° C. and an improvement in $CO_2$ selectivity was observed over data at 400° C.

Some of the results obtained in the above Examples are summarised in the following Tables 1–5:

TABLE 1

Benzene destruction over pelleted catalysts, GHSV = 70,000 $h^{-1}$.

| Catalyst | Temperature/° C. | % Conversion | % COx Selectivity |
|---|---|---|---|
| $U_3O_8$ | 400 | 100 | 100 |
| $U/SiO_2$ | 400 | 100 | 100 |
| $Co_3O_4/U_3O_8$ | 350 | 99 | 100 |
| $CuO/U_3O_8$ | 350 | 93 | 100 |
| $Co_3O_4$ | 400 | 82 | 100 |

TABLE 2

Butane destruction over pelleted catalysts, GHSV = 70,000 $h^{-1}$.

| Catalyst | Temperature/° C. | % Conversion | % COx Selectivity |
|---|---|---|---|
| $U_3O_8$ | 600 | 81 | 100 |
| $U/SiO_2$ | 500 | 100 | 100 |
| $Cr/U/SiO_2$ | 400 | 93 | 100 |
| $Cu/U/SiO_2$ | 450 | 95 | 100 |
| $Co_3O_4$ | 600 | 70 | 100 |

TABLE 3

Chlorobenzene destruction over powdered catalysts, GHSV = 70,000 $h^{-1}$.

| Catalyst | Temperature/° C. | % Conversion | % COx Selectivity |
|---|---|---|---|
| $U_3O_8$ | 350 | 100 | 100 |
| $U/SiO_2$ | 400 | 100 | 100 |
| $Co/U/SiO_2$ | 400 | 100 | 100 |
| $Cr/U/SiO_2$ | 400 | 100 | 100 |
| $Cu/U/SiO_2$ | 400 | 100 | 100 |
| $Fe/U/SiO_2$ | 400 | 100 | 100 |

TABLE 3-continued

Chlorobenzene destruction over powdered catalysts, GHSV = 70,000 $h^{-1}$.

| Catalyst | Temperature/° C. | % Conversion | % COx Selectivity |
|---|---|---|---|
| $Ni/U/SiO_2$ | 400 | 89 | 100 |
| $Mn/U/SiO_2$ | 450 | 100 | 100 |
| $Co_3O_4$ | 600 | 62 | 100 |

TABLE 4

Cyclohexanone destruction over powdered catalysts, GHSV = 70,000 $h^{-1}$.

| Catalyst | Temperature/° C. | % Conversion | % COx Selectivity |
|---|---|---|---|
| $U_3O_8$ | 300 | 100 | 100 |
| $U/SiO_2$ | 300 | 100 | 100 |
| $Co_3O_4$ | 300 | 0 | — |
|  | 350 | 100 | 100 |

TABLE 5

Butylacetate destruction over powdered catalysts, GHSV = 70,000 $h^{-1}$.

| Catalyst | Temperature/° C. | % Conversion | % COx Selectivity |
|---|---|---|---|
| $U_3O_8$ | 350 | 100 | 100 |
| $U/SiO_2$ | 350 | 100 | 100 |
| $Cu/U/SiO_2$ | 350 | 100 | 100 |

We claim:

1. A method of preparing a catalyst comprising $U_3O_8$ supported on a support comprising $SiO_2$, the method comprising impregnating the support with uranium nitrate and decomposing the nitrate to $U_3O_8$ by calcining the impregnated support at a temperature of about 300° C., and then at a higher temperature of about 800° C.

2. The method of claim 1, further including addition of a dopant to the catalyst, wherein the dopant is a metal or a metal oxide that controls product selectivity.

3. The method of claim 2, wherein the dopant is a metal oxide.

4. The method of claim 3 wherein the dopant is selected from the group consisting of the oxides of Co, Mo, V, Ni, Cu, Cr, Mn and Fe and mixtures thereof.

5. The method of claim 1 which further comprises pelleting the catalyst.

6. The method of claim 1, wherein the catalyst consists essentially of $U_3O_8$.

7. A method of preparing a catalyst comprising impregnating a support material comprising $SiO_2$ with a solution of $UO_2(NO_3)6H_2O$ in distilled water to obtain a catalyst precursor, then calcining the precursor by a two stage process which involves heating the precursor in static air for 1 hour at about 300° C. and then for a further 3 hours at about 800° C.

8. The method of claim 7, wherein the catalyst is doped with a dopant which is selected from the group consisting of metals, metal oxides and mixtures thereof, wherein the dopant controls product selectivity.

9. The method of claim 8, wherein the dopant is a metal oxide.

10. The method of claim 9, wherein the catalyst precursor is dried and impregnated with the nitrate solution of the dopant material, then the resultant dope precursor is dried before calcination of the precursor.

11. The method of claim 9, wherein the dopant is selected from the group consisting of the oxides of Co, Mo, V, Ni, Cu, Cr, Mn and Fe and mixtures thereof.

12. The method of claim 7, wherein impregnating the support material with a solution of $UO_2(NO_3)6H_2O$ comprises impregnating the support material to incipient wetness.

13. The method of claim 12, further comprising doping the catalyst with a transition metal dopant, an oxide thereof, or mixtures of the metal dopant and an oxide thereof.

14. The method of claim 7, wherein calcining the precursor produces a catalyst that consists essentially of $U_3O_8$.

15. A method of preparing a composition comprising a catalyst and a dopant supported on a support comprising $SiO_2$, the method comprising impregnating the support to incipient wetness with uranium nitrate and decomposing the nitrate to $U_3O_8$ in a two stage process, in which the impregnated support is calcined at a first temperature of about 300° C. and then calcined at a second higher temperature that produces the catalyst with a uranium component of the catalyst consisting essentially of $U_3O_8$.

* * * * *